(12) United States Patent
Gubbins et al.

(10) Patent No.: US 12,236,986 B2
(45) Date of Patent: Feb. 25, 2025

(54) HEAT-ASSISTED MAGNETIC RECORDING HEAD WITH AN INTEGRATED PHOTODIODE

(71) Applicant: Seagate Technology LLC, Fremont, CA (US)

(72) Inventors: Mark Anthony Gubbins, Letterkenny (IE); Christopher Neil Harvey, Springtown (GB); Aidan Dominic Goggin, Redcastle (IE); Fadi El Hallak, Londonderry (GB); Reshma Anamari Mohandas, Londonderry (GB); Bryn John Howells, Londonderry (GB); Scott Eugene Olson, Eagan, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/537,957

(22) Filed: Dec. 13, 2023

(65) Prior Publication Data

US 2024/0112696 A1    Apr. 4, 2024

Related U.S. Application Data

(63) Continuation of application No. 17/809,722, filed on Jun. 29, 2022, now Pat. No. 11,908,499.

(51) Int. Cl.
*G11B 5/09* (2006.01)
*G11B 5/31* (2006.01)
*G11B 5/48* (2006.01)
*G11B 5/60* (2006.01)
*G11B 7/126* (2012.01)
(Continued)

(52) U.S. Cl.
CPC ............ *G11B 5/6088* (2013.01); *G11B 5/314* (2013.01); *G11B 5/4866* (2013.01); *G11B 7/126* (2013.01); *G11B 13/08* (2013.01); *G11B 2005/0021* (2013.01)

(58) Field of Classification Search
None
See application file for complete search history.

(56) References Cited

U.S. PATENT DOCUMENTS 8,854,930 B1 * 10/2014 Clinton .................... G11B 5/02
  360/59
8,873,352 B1 * 10/2014 Jandric .................. G11B 5/314
  369/13.13

(Continued)

*Primary Examiner* — Peter Vincent Agustin
(74) *Attorney, Agent, or Firm* — Mueting Raasch Group

(57) ABSTRACT

A heat-assisted magnetic recording head includes a laser, a near-field transducer, a primary waveguide, a secondary waveguide, and a photodiode. The laser is configured to emit electromagnetic radiation. The near-field transducer is configured to focus and emit an optical near-field. The primary waveguide configured to receive the electromagnetic radiation and propagate the electromagnetic radiation toward and proximal to the near-field transducer. The secondary waveguide configured to receive a portion of the electromagnetic radiation from the primary waveguide. The photodiode configured to receive the portion of the electromagnetic radiation from the secondary waveguide and emit a signal that represents a magnitude of the electromagnetic radiation that the laser emits.

8 Claims, 14 Drawing Sheets

(51) Int. Cl.
*G11B 13/08* (2006.01)
*G11B 5/00* (2006.01)

(56) References Cited

U.S. PATENT DOCUMENTS

| | | | |
|---|---|---|---|
| 9,053,717 B1* | 6/2015 | Matsumoto | G11B 5/314 |
| 9,576,595 B1 | 2/2017 | Hipwell | |
| 9,799,359 B1 | 10/2017 | Olson | |
| 10,431,253 B1* | 10/2019 | McGurk | G11B 11/24 |
| 10,643,651 B1 | 5/2020 | Rea | |
| 10,692,525 B2 | 6/2020 | Goggin | |
| 11,120,824 B1 | 9/2021 | Peng | |
| 11,120,830 B1 | 9/2021 | Goggin | |
| 11,574,648 B2 | 2/2023 | Peng | |
| 11,908,499 B1* | 2/2024 | Gubbins | G11B 5/4866 |
| 2006/0005216 A1* | 1/2006 | Rausch | G11B 7/1387 |
| | | | 720/659 |
| 2006/0133230 A1* | 6/2006 | Buechel | G11B 7/1353 |
| 2009/0208171 A1* | 8/2009 | Gage | G11B 5/314 |
| | | | 385/37 |
| 2011/0122737 A1* | 5/2011 | Shimazawa | G11B 5/314 |
| | | | 360/59 |
| 2012/0176874 A1* | 7/2012 | Komura | G01D 5/34 |
| | | | 250/237 G |
| 2014/0254335 A1* | 9/2014 | Gage | G11B 5/6088 |
| | | | 369/13.33 |
| 2015/0043317 A1* | 2/2015 | Seigler | G11B 5/105 |
| | | | 369/13.33 |
| 2016/0133285 A1* | 5/2016 | Peng | G11B 5/314 |
| | | | 369/13.33 |
| 2024/0112696 A1* | 4/2024 | Gubbins | G11B 5/4866 |

\* cited by examiner

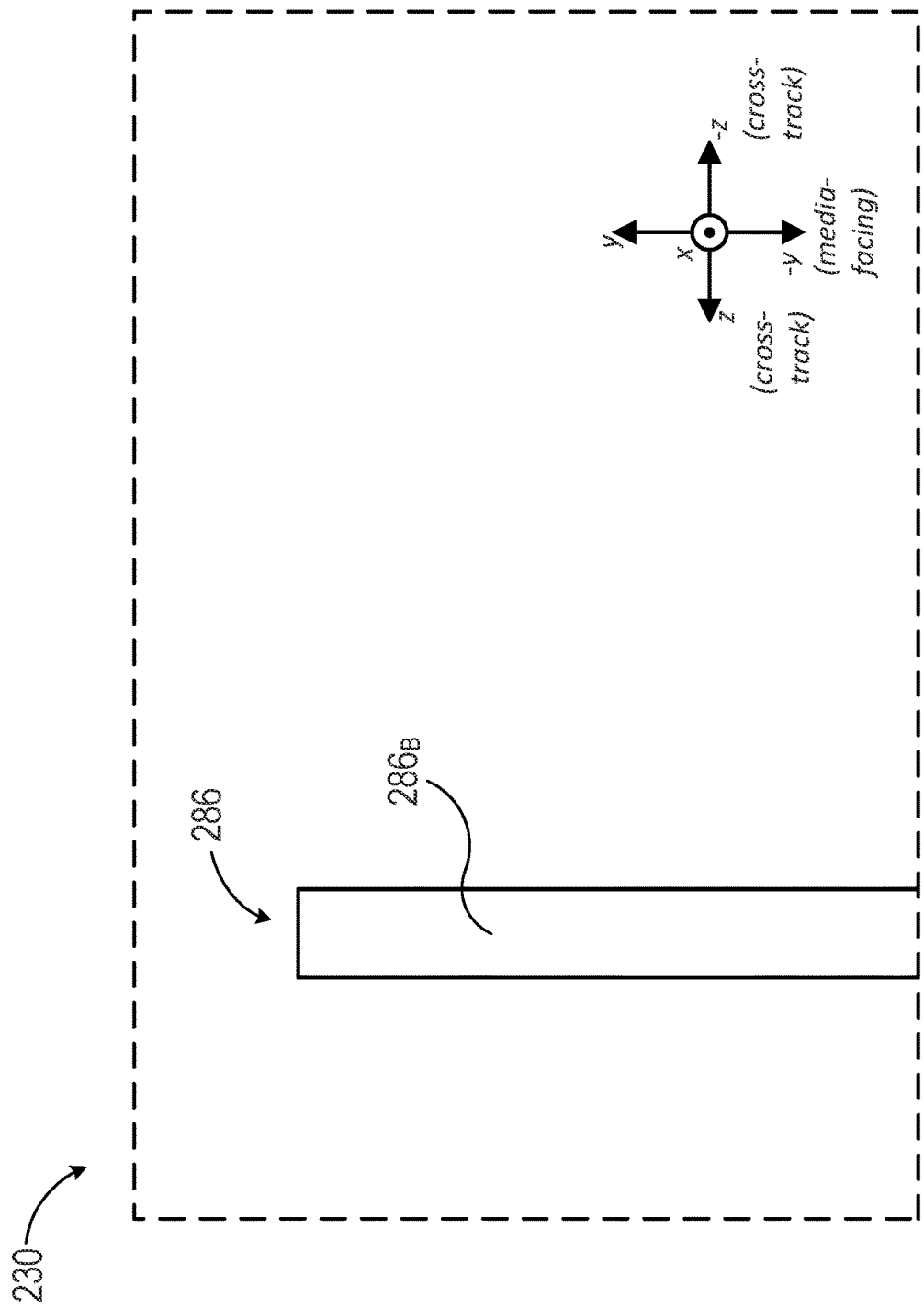

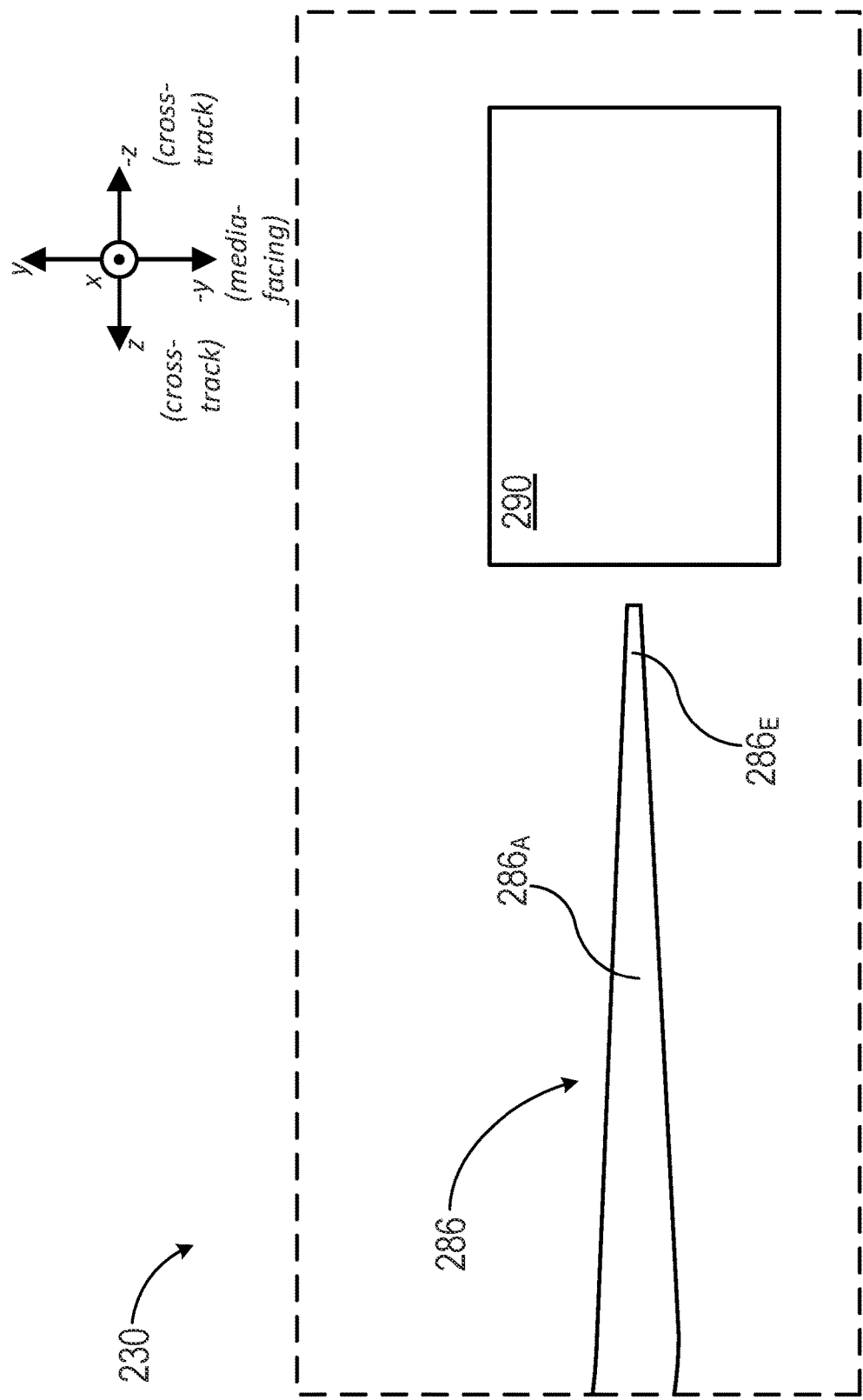

HEAT-ASSISTED MAGNETIC RECORDING HEAD WITH AN INTEGRATED PHOTODIODE

RELATED APPLICATIONS

This application is a continuation of U.S. application Ser. No. 17/809,722, filed Jun. 29, 2022, the contents of which is hereby incorporated by reference in its entirety.

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. Specifically, light emitted from the laser may couple to the NFT to produce localized surface plasmons (LSPs). Energy of the LSPs may then be emitted by the NFT to produce the hot spot on the magnetic disk. Operating the laser at a power that is too low may inhibit the ability to adequately heat the surface of the magnetic disk. Operating the laser at a power that is too high may introduce excess heat into the HAMR head, potentially leading to early degradation of components and reducing the lifetime of the HAMR head. Additionally, sudden changes in emitted laser power (e.g., due to mode hops) may result in inaccurate data writing and subsequent retrieval, potentially reducing the areal density capability (ADC) of the HDD by requiring an ADC margin to be introduced in order to compensate for variations in the write cycles (e.g., variation in written track width, variation in write timing).

SUMMARY

The present disclosure describes a heat-assisted magnetic recording (HAMR) head having a laser, a primary waveguide, a secondary waveguide, and a photodiode. The laser emits light of a target frequency into the primary waveguide. Light from the laser is directed through the primary waveguide toward a near-field transducer (NFT) of the HAMR head, where the light may couple to the NFT and excite localized surface plasmons (LSPs) on the NFT. The secondary waveguide includes a segment that is adjacent to, but separated by a gap from, a segment of the primary waveguide. A portion of the light that is transmitted through the primary waveguide may be received by the secondary waveguide through evanescent coupling across the gap between the segment of the primary waveguide and the segment of the secondary waveguide. The secondary waveguide may direct the received portion of light to the photodiode. The photodiode may respond to the received portion of light by producing a signal (e.g., a current). The strength of the signal may be proportional to the intensity of the light that is emitted by the laser. As such, changes in the intensity of emitted light (e.g., during a mode hop) may be detected as a change in signal from the photodiode. In some examples, the signal from the photodiode may be used to provide a compensative signal to the laser to increase or reduce the laser output in response to the change in laser power that the photodiode detects. Monitoring the laser power output by coupling a portion of the light to a secondary waveguide, measuring the intensity of the light with a photodiode, and using the signal produced by the photodiode the change the input power to the laser may enable more consistent laser output, potentially providing more accurate write cycles (e.g., track width, write timing) and higher ADC to an associated hard disk drive (HDD).

In one example, a heat-assisted magnetic recording head includes a laser configured to emit electromagnetic radiation; an NFT configured to focus and emit an optical near-field; a primary waveguide configured to receive the electromagnetic radiation and propagate the electromagnetic radiation toward and proximal to the near-field transducer; a secondary waveguide configured to receive a portion of the electromagnetic radiation from the primary waveguide; and a photodiode configured to receive the portion of the electromagnetic radiation from the secondary waveguide and emit a signal that represents a magnitude of the electromagnetic radiation that the laser emits.

In another example, a heat-assisted magnetic recording head includes a laser configured to emit electromagnetic radiation; an NFT configured to focus and emit an optical near-field; a photodiode configured to receive a portion of the electromagnetic radiation; a primary waveguide including a first segment adjacent to the laser, a second segment adjacent to the NFT, and a third segment disposed between the first segment and the second segment of the primary waveguide; and a secondary waveguide including a first segment adjacent to the photodiode, a second segment that is at an opposite end of the secondary waveguide from the first segment, and a third segment disposed between the first segment and the second segment of the secondary waveguide.

In another example, a heat-assisted magnetic recording head includes a laser configured to emit electromagnetic radiation; an NFT configured to focus and emit an optical near-field; a photodiode configured to receive a portion of the electromagnetic radiation; a primary waveguide including a first segment adjacent to the laser and coupled to a coupler that is configured to direct the electromagnetic radiation emitted by the laser into the primary waveguide, a second segment adjacent to the NFT, and a third segment disposed between the first end and the second end of the primary waveguide; and a secondary waveguide including a first segment adjacent to the photodiode, a second segment that is at an opposite end of the secondary waveguide from the first segment, and a third segment disposed between the first end and the second end of the primary waveguide, wherein the third segment of the primary waveguide and the third segment of the secondary waveguide are adjacent and substantially parallel to each other and are separated by a gap.

These and other features and aspects of various examples may be understood in view of the following detailed discussion and accompanying drawings.

BRIEF DESCRIPTION OF THE DRAWINGS

FIG. 6A is a view of a secondary waveguide of an example HAMR head, in accordance with aspects of this disclosure.

FIG. 7A is a view of a secondary waveguide and a photodiode of an example HAMR head, in accordance with aspects of this disclosure.

DETAILED DESCRIPTION

Figure 1:
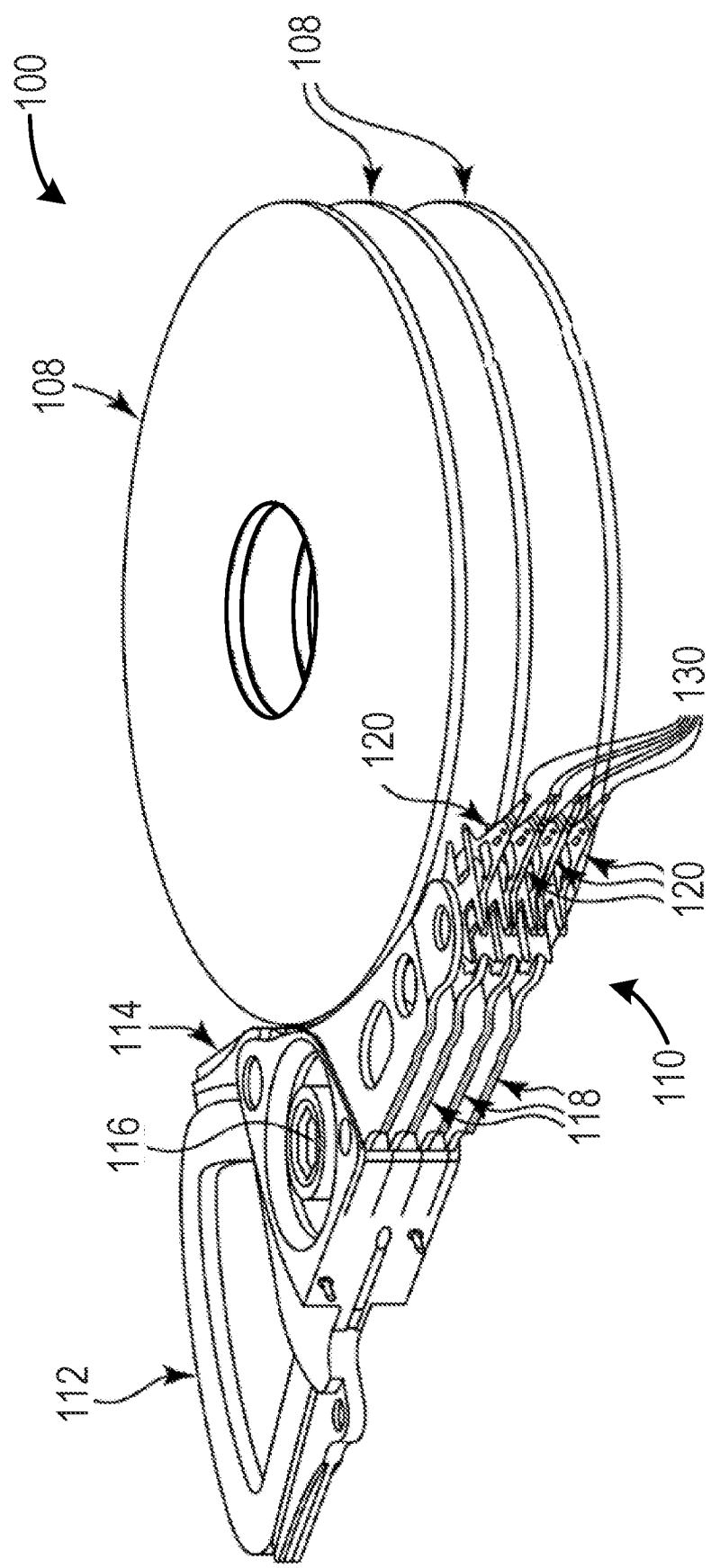
FIG. 1 is a perspective view of an example hard disk drive, in accordance with aspects of this disclosure.

FIG. 1 is a perspective view of an example heat-assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a HAMR head 130. Each HAMR head 130 is configured to write data to and read data from a surface of a magnetic disk 108. HSA 110 of FIG. 1 includes a voice coil drive actuator 112. Voice coil drive actuator 112 produces a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus HAMR heads 130, to move relative to magnetic disks 108. A HAMR head 130 may thus be positioned proximate to a location on a surface of a magnetic disk 108 during a read and/or write operation of HDD 100.

Figure 2:
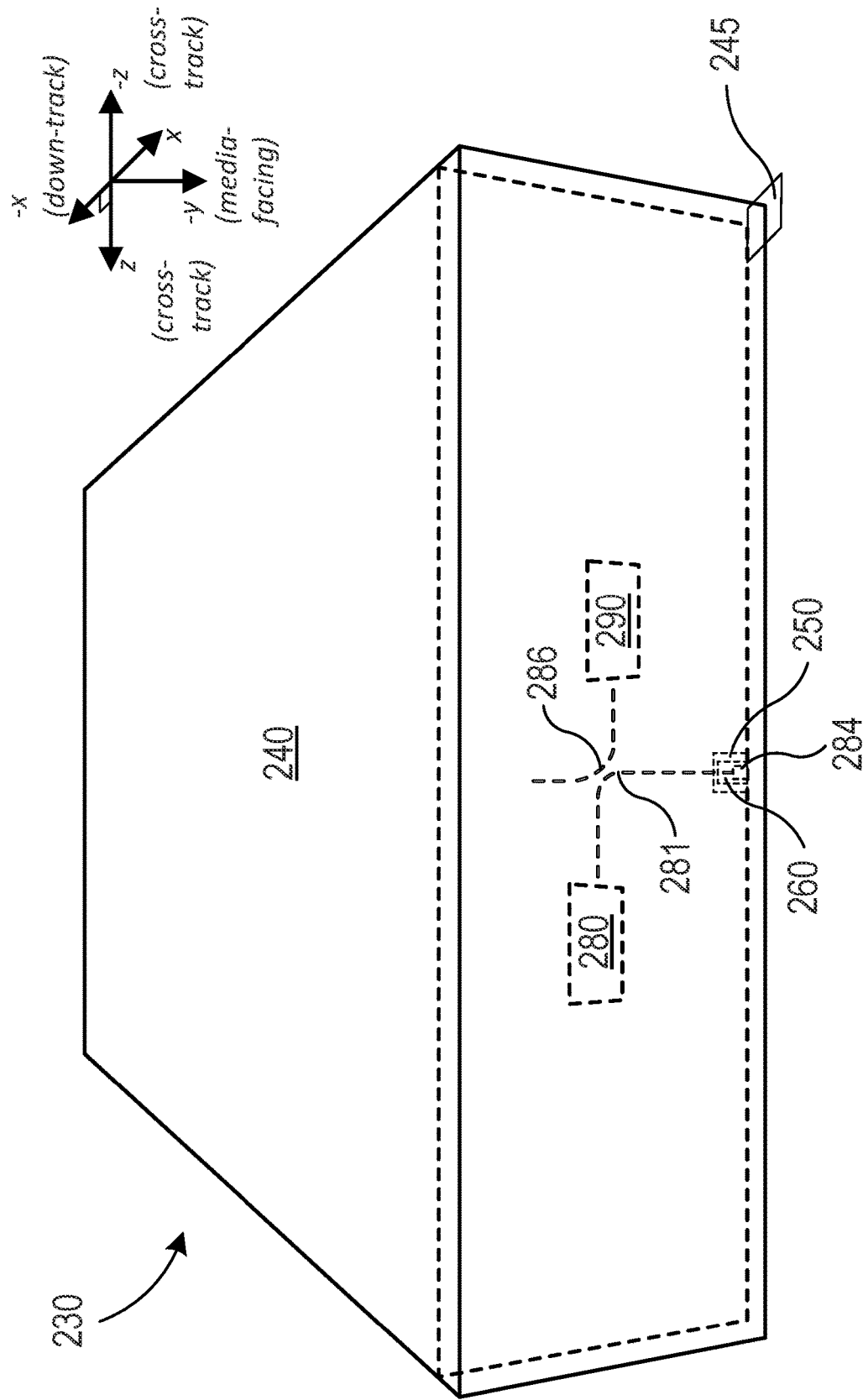
FIG. 2 is a perspective view of an example HAMR head, in accordance with aspects of this disclosure.

FIG. 2 is a perspective view of an example HAMR head 230, in accordance with aspects of this disclosure. HAMR head 230 may be an example of a HAMR head 130 of FIG. 1. HAMR head 230 includes a slider body 240 that houses a writer 250 and a reader 260. In the example of HAMR head 230, some features or parts of features of writer 250 and/or reader 260 are presented on a media-facing surface 245 of slider body 240 that is positioned proximal to a surface of a magnetic disk (e.g., a magnetic disk 108 of FIG. 1) during some operations of the HDD (e.g., write operations and/or read operations of HDD 100 of FIG. 1). HAMR head 230 may be maintained at a spacing (e.g., a head-media spacing) from a surface of the magnetic disk during some operations of HDD 100. In the example of a write operation, a spacing may be maintained between writer 250 and the surface of the magnetic disk. In the example of a read operation, a spacing may be maintained between reader 260 and the surface of the magnetic disk. During such operations, media-facing surface 245 faces and is held proximate to the moving surface of the magnetic disk by a cushion of gas, known as an active air bearing (AAB), that is produced from a dynamic flow of gas across a pattern of recessed sub-surfaces bound within the volume of slider body 240. An operation of HDD 100 may further include a write cycle (e.g., by writer 250), a read cycle (e.g., by reader 260), and/or another cycle (e.g., a contact detection operation) while HAMR head 230 is maintained at a spacing (e.g., a head-media spacing) from the surface of the magnetic disk.

In accordance with aspects of this disclosure, HAMR head 230 includes a laser 280, a primary waveguide 281, a near-field transducer (NFT) 284, a secondary waveguide 286, and a photodiode 290. Laser 280, primary waveguide 281, near-field transducer (NFT) 284, secondary waveguide 286, and photodiode 290 of HAMR head 230 are integrated into slider body 240. In other examples, a laser may be mounted to slider body 240 either directly or to a submount that is coupled to slider body 240.

Laser 280 is configured to emit electromagnetic radiation. Laser 280 may, for example, emit electromagnetic radiation having a wavelength in the near infrared range (e.g., approximately 830 nm) or visible range. Various configurations of laser 280 are contemplated. For example, laser 280 may be configured as an edge-emitting laser. In other examples, laser 280 may be configured as a surface-emitting laser (e.g., a vertical cavity surface-emitting laser). In some examples, laser 280 is fabricated through on-wafer laser (OWL) processing. Steps of OWL processing may include the growth of an epitaxial layer or stack on a donor substrate, patterning of the epitaxial layer or stack on the donor substrate, transfer (e.g., by transfer printing) of the patterned epitaxial layer or stack from the donor substrate to a wafer on which HAMR head 230 is being fabricated (e.g., a wafer that includes some components of HAMR head 230 that have already been fabricated), and further processing of the epitaxial layer or stack to form the final profile and features of laser 280. In some examples, epitaxial layers of laser 280 include gallium arsenide, indium gallium arsenide, and/or aluminum gallium arsenide.

Primary waveguide 281 is configured to receive the electromagnetic radiation that laser 280 emits and propagate the electromagnetic radiation toward and proximal to NFT 284. The electromagnetic radiation may then couple to electrons of NFT 284 to excite localized surface plasmons (LSPs) on NFT 284. Primary waveguide 281 may include a material having a high refractive index (e.g., greater than 1.5) and that is optically transparent at the wavelength of the electromagnetic radiation. In some examples, primary waveguide 281 includes niobium oxide.

NFT 284 is configured to focus and emit an optical near-field of LSPs that are excited on NFT 284 through coupling with electromagnetic radiation that propagates in primary waveguide 281. An optical near-field that NFT 284 emits may be focused on an area of a magnetic disk that is proximal to HAMR head 230 (e.g., a magnetic disk 108 of FIG. 1). Energy of the emitted optical near-field may heat and lower the coercivity of magnetic grains in the area of focus on the magnetic disk. The lower coercivity of the magnetic grains may enable a magnetic field from writer 250 to orient magnetic moments of the magnetic grains in the area of focus, thus enabling writing of bits of data on the magnetic disk.

NFT 284 includes a plasmonic metal. As used herein, a plasmonic metal is a metal that possesses properties (e.g., electrical properties, optical properties) that promote resonance coupling between electromagnetic radiation (e.g., from primary waveguide 281) and free electrons of the plasmonic metal. Examples of plasmonic metals include gold, silver, ruthenium, copper, aluminum, and rhodium, among others. NFT 284 may include an alloy that includes a plasmonic metal. In some examples, NFT 284 includes a plasmonic metal and a noble metal (e.g., palladium, osmium, iridium, or platinum).

Secondary waveguide 286 is configured to receive a portion of the electromagnetic radiation from primary waveguide 281. Secondary waveguide 286 may receive a portion of the electromagnetic radiation through evanescent coupling between primary waveguide 281 and secondary waveguide 286. That is, a segment of secondary waveguide 286 may be disposed sufficiently close to a segment of primary waveguide 281 to enable a portion of the electromagnetic radiation in primary waveguide 281 to couple to and propagate in secondary waveguide 286. The portion of the electromagnetic radiation may then propagate toward photodiode 290.

Photodiode 290 is configured to receive the portion of the electromagnetic radiation from secondary waveguide 286 and emit a signal. The signal may represent a magnitude of the electromagnetic radiation that laser 280 emits. For example, photodiode 290 may produce a current in response to receiving the portion of the electromagnetic radiation, and the magnitude of the current may depend on the intensity (e.g., power) of the electromagnetic radiation that laser 280 emits. Thus, photodiode 290 may enable monitoring of the emissive power of laser 280 during operations of HAMR head 230. Changes in emissive power, such as those related to mode hops (e.g., sudden or gradual changes in emissive power due to thermal or other factors), may be detected as changes in current from photodiode 290. In some examples, a change in current from photodiode 290 may trigger the application of a compensative power to laser 280 in order to maintain a target emissive power. That is, the inclusion of photodiode 290 in HAMR head 230 may enable a more stable, consistent power to be emitted from laser 280. A more stable power emitted from laser 280 may in turn enable more consistent write cycles (e.g., track widths, timing) and may reduce the requirement for margin to be applied to the areal density capability (ADC) of an associated HDD, potentially increasing the ADC of the HDD.

Layers of photodiode 290 may be fabricated and patterned on a separate wafer (e.g., a donor wafer or substrate) and transferred from the donor wafer to a wafer on which HAMR head 230 is being fabricated (e.g., a wafer that includes some components of HAMR head 230 that have already been fabricated). This may be similar to the OWL process that may be used to fabricate laser 280. In some examples, laser 280 and photodiode 290 may be fabricated on and transferred from a single donor wafer. Transfer of laser 280 and photodiode 290 from the donor wafer to the wafer on which HAMR head 230 is being fabricated may occur simultaneously or independently. In other examples, laser 280 and photodiode 290 are fabricated on and transferred independently from separate donor wafers.

Figure 3A:
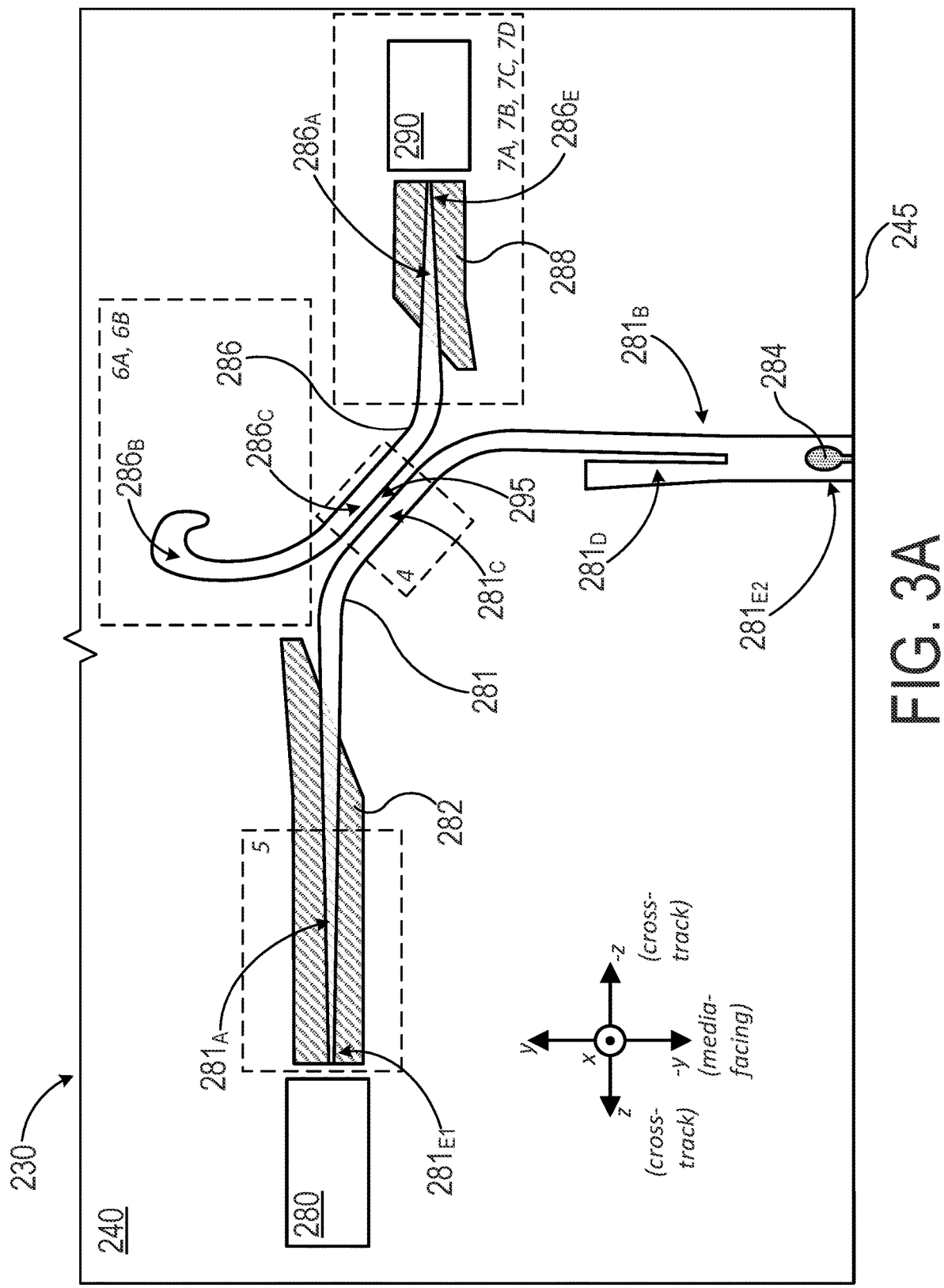
FIG. 3A is a view of an example HAMR head, in accordance with aspects of this disclosure.

FIG. 3A is a view of an example HAMR head, in accordance with aspects of this disclosure. HAMR head 230 may be an example of HAMR head 230 of FIG. 2. HAMR head 230 includes a laser 280, a primary waveguide 281, an NFT 284, a secondary waveguide 286, and a photodiode 290 that are integrated into a slider body 240.

Primary waveguide 281 includes a first segment $281_A$ adjacent to laser 280, a second segment $281_B$ adjacent to NFT 284, and a third segment $281_C$ disposed between first segment $281_A$ and second segment $281_B$. In the context of the present disclosure, the term "adjacent" may imply either physical contact or near, but not in physical contact (e.g., separated by a gap). First segment $281_A$ includes a first end $281_{E1}$ of primary waveguide 281 that is adjacent to laser 280. In some examples, first segment $281_A$ is substantially parallel to a media-facing surface 245 of HAMR head 230. First segment $281_A$ is coupled to a coupler 282 that is configured to direct electromagnetic radiation emitted by laser 280 into primary waveguide 281. Coupler 282 of HAMR head 230 has a rectangular portion proximal to laser 280 and a second portion that tapers away from laser 280. Other shapes and geometries of coupler 282 are contemplated (e.g., circular geometries, geometries having curved and/or straight legs and/or branches). Coupler 282 may include a material (e.g., a dielectric material) having a different (e.g., lower) refractive index than primary waveguide 281.

Second segment $281_B$ includes a second end $281_{E2}$ of primary waveguide 281 that is adjacent to NFT 284. In some examples, second segment $281_B$ is substantially orthogonal to media-facing surface 245. Second segment $281_B$ may include a mode converter $281_D$. Mode converter $281_D$ is a branch of primary waveguide 281 that is configured to convert an optical mode of electromagnetic radiation that is emitted by laser 280 (e.g., a transverse electric mode to a transverse magnetic mode, a first transverse electric mode to a second transverse electric mode).

Secondary waveguide 286 includes a first segment $286_A$ adjacent to the photodiode 290, a second segment $286_B$ that is at an opposite end of secondary waveguide 286 from first segment $286_A$, and a third segment $286_C$ disposed between first segment $286_A$ and second segment $286_B$. Third segment $281_C$ of primary waveguide 281 and third segment $286_C$ of secondary waveguide 286 are adjacent and substantially parallel to each other and are separated by a gap 295. In this example, third segment $281_C$ and third segment $286_C$ are disposed at an angle relative to media-facing surface 245, first segments $281_A$ and $286_A$, and second segments $281_B$ and $286_B$, although other orientations of third segment $281_C$ and third segment $286_C$ are contemplated. A portion of electromagnetic radiation that laser 280 emits may propagate in primary waveguide 281 and couple to secondary waveguide 286 across gap 295. That is, third segment $286_C$ of secondary waveguide 286 may receive electromagnetic radiation from third segment $281_C$ of primary waveguide 281.

First segment $286_A$ of secondary waveguide includes an end $286_E$ of secondary waveguide 286 that is adjacent to photodiode 290. First segment $286_A$ is coupled to a decoupler 288 that is configured to direct electromagnetic radiation (e.g., electromagnetic radiation received from primary waveguide 281) into photodiode 290. Decoupler 288 of HAMR head 230 has a rectangular portion proximal to photodiode 290 and a second portion that tapers away from photodiode 290. Other shapes and geometries of decoupler 288 are contemplated (e.g., circular geometries, geometries having curved and/or straight legs and/or branches). Decoupler 288 may include a material (e.g., a dielectric material) having a different (e.g., lower) refractive index than secondary waveguide 286.

Second segment $286_B$ of HAMR head 230 includes a hooked shape that may mitigate reflections of electromagnetic radiation into photodiode 290. Other shapes of second segment $286_B$ are contemplated (e.g., straight, blocked, angled).

It should be noted that coupler 282, mode converter $281_D$, and decoupler 288 are optional and in no way required for successful operation of HAMR 230 and the features described herein. These features may be components that are used for particular configurations of HAMR head 230 (e.g., particular configurations of laser 280 (e.g., emission wavelengths) and/or particular configurations (e.g., geometries) of NFT 284). Thus, while a particular embodiment of HAMR head 230 is illustrated herein, it should be understood that some, in any combination, of the above features may be omitted in any particular substantiation of HAMR head 230.

Figure 3B:
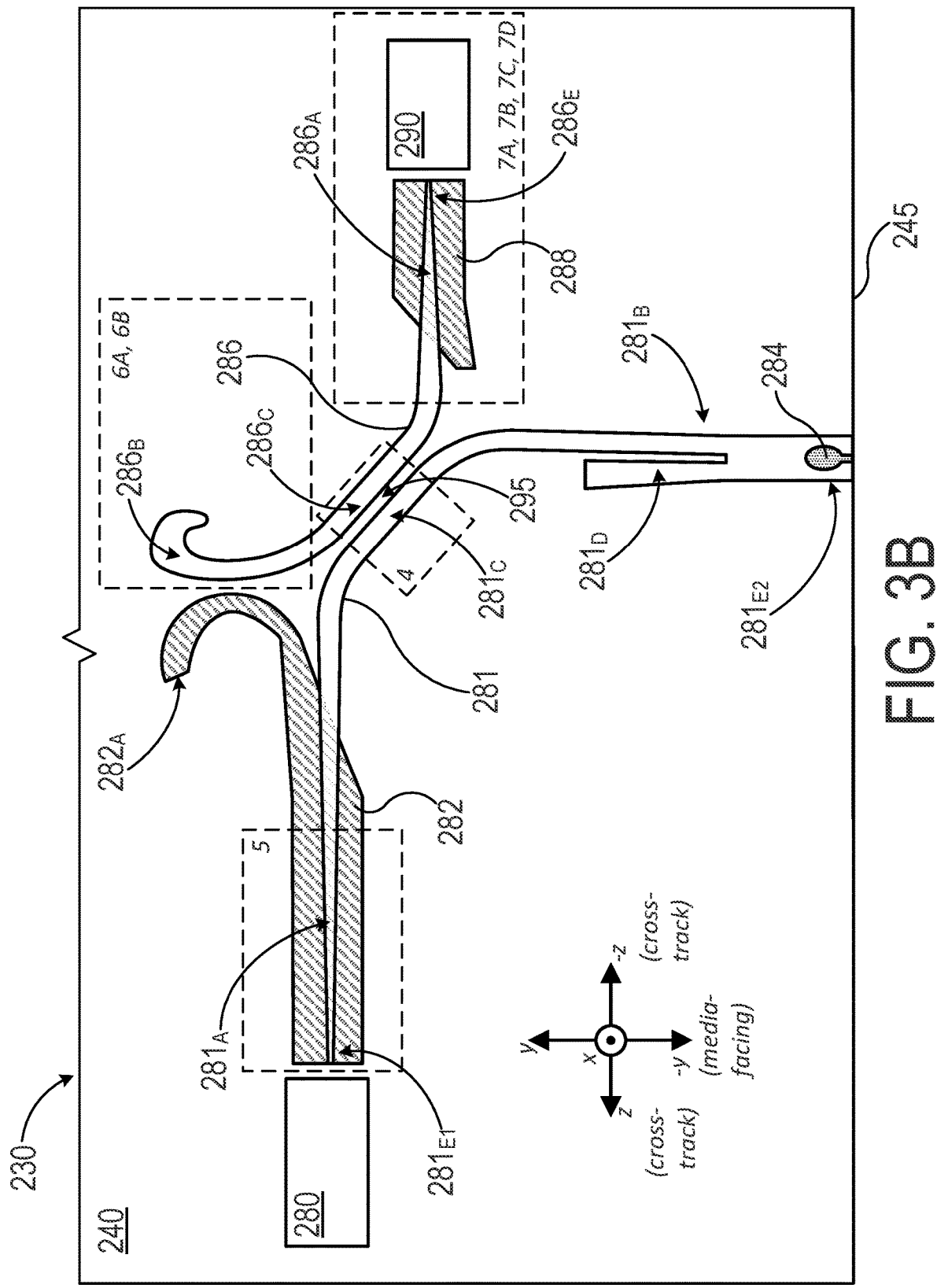
FIG. 3B is a view of an example HAMR head, in accordance with aspects of this disclosure.

FIG. 3B is a view of an example HAMR head, in accordance with aspects of this disclosure. HAMR head 230 may be an example of HAMR head 230 of FIG. 2. HAMR head 230 of FIG. 3B may be an alternative embodiment of HAMR head 230 of FIG. 3A. HAMR head 230 includes a laser 280, a primary waveguide 281, an NFT 284, a secondary waveguide 286, and a photodiode 290 that are integrated into a slider body 240. Primary waveguide 281 includes a first segment $281_A$ adjacent to laser 280, a second segment $281_B$ adjacent to NFT 284, and a third segment $281_C$ disposed between first segment $281_A$ and second segment $281_B$.

First segment $281_A$ includes a first end $281_{E1}$ of primary waveguide 281 that is adjacent to laser 280. In some examples, first segment $281_A$ is substantially parallel to a media-facing surface 245 of HAMR head 230. First segment $281_A$ is coupled to a coupler 282 that is configured to direct electromagnetic radiation emitted by laser 280 into primary waveguide 281. Coupler 282 of HAMR head 230 has a rectangular portion proximal to laser 280, a second portion that tapers away from laser 280, and a curved optical feature $282_A$ that is configured to disperse stray electromagnetic radiation. Other shapes and geometries of coupler 282 and/or curved optical feature $282_A$ are contemplated (e.g., circular geometries, geometries having curved and/or straight legs and/or branches).

Second segment $281_B$ includes a second end $281_{E2}$ of primary waveguide 281 that is adjacent to NFT 284. In some examples, second segment $281_B$ is substantially orthogonal to media-facing surface 245. Second segment $281_B$ may include a mode converter $281_D$. Mode converter $281_D$ is a branch of primary waveguide 281 that is configured to convert an optical mode of electromagnetic radiation that is emitted by laser 280 (e.g., a transverse electric mode to a transverse magnetic mode, a first transverse electric mode to a second transverse electric mode).

Secondary waveguide 286 includes a first segment $286_A$ adjacent to the photodiode, a second segment $286_B$ that is at an opposite end of secondary waveguide 286 from first segment $286_A$, and a third segment $286_C$ disposed between first segment $286_A$ and second segment $286_B$. Third segment $281_C$ of primary waveguide 281 and third segment $286_C$ of secondary waveguide 286 are adjacent and substantially parallel to each other and are separated by a gap 295. In this example, third segment $281_C$ and third segment $286_C$ are disposed at an angle relative to media-facing surface 245, first segments $281_A$ and $286_A$, and second segments $281_B$ and $286_B$, although other orientations of third segment $281_C$ and third segment $286_C$ are contemplated. A portion of electromagnetic radiation that laser 280 emits may propagate in primary waveguide 281 couple to secondary waveguide 286 across gap 295.

First segment $286_A$ of secondary waveguide includes an end $286_E$ of secondary waveguide 286 that is adjacent to photodiode 290. First segment $286_A$ is coupled to a decoupler 288. Decoupler 288 of HAMR head 230 has a rectangular portion proximal to photodiode 290 and a second portion that tapers away from photodiode 290. Other shapes and geometries of decoupler 288 are contemplated (e.g., circular geometries, geometries having curved and/or straight legs and/or branches). Second segment $286_B$ of HAMR head 230 includes a hooked shape that may mitigate reflections of electromagnetic radiation into photodiode 290. Other shapes of second segment $286_B$ are contemplated (e.g., straight, blocked, angled).

It should be noted that coupler 282 (including curved optical feature $282_A$), mode converter $281_D$, and decoupler 288 are optional and in no way required for successful operation of HAMR 230 and the features described herein. These features may be components that are used for particular configurations of HAMR head 230 (e.g., particular configurations of laser 280 (e.g., emission wavelengths) and/or particular configurations (e.g., geometries) of NFT 284). Thus, while a particular embodiment of HAMR head 230 is illustrated herein, it should be understood that some, in any combination, of the above features may be omitted in any particular substantiation of HAMR head 230.

Figure 3C:
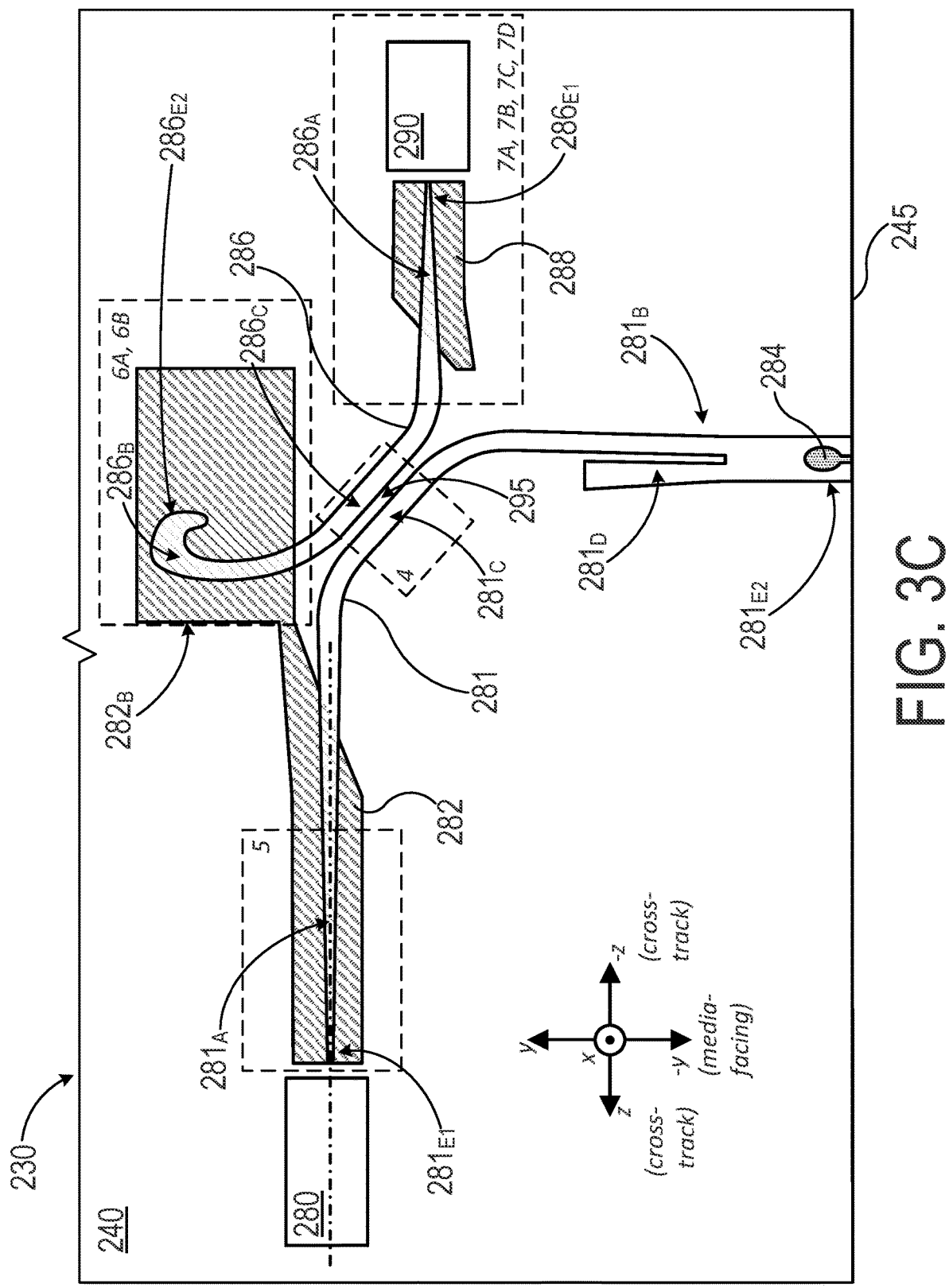
FIG. 3C is a view of an example HAMR head, in accordance with aspects of this disclosure.

FIG. 3C is a view of an example HAMR head, in accordance with aspects of this disclosure. HAMR head 230 may be an example of HAMR head 230 of FIG. 2. HAMR head 230 of FIG. 3C may be an alternative embodiment of HAMR head 230 of FIG. 3A. HAMR head 230 includes a laser 280, a primary waveguide 281, an NFT 284, a secondary waveguide 286, and a photodiode 290 that are integrated into a slider body 240. Primary waveguide 281 includes a first segment $281_A$ adjacent to laser 280, a second segment $281_B$ adjacent to NFT 284, and a third segment $281_C$ disposed between first segment $281_A$ and second segment $281_B$.

First segment $281_A$ includes a first end $281_{E1}$ of primary waveguide 281 that is adjacent to laser 280. In some examples, first segment $281_A$ is substantially parallel to a media-facing surface 245 of HAMR head 230. First segment $281_A$ is coupled to a coupler 282 that is configured to direct electromagnetic radiation emitted by laser 280 into primary waveguide 281. Coupler 282 of HAMR head 230 has a rectangular portion proximal to laser 280, a second portion that tapers away from laser 280, and an escape slab $282_B$ that is configured to disperse stray electromagnetic radiation. Other shapes and geometries of coupler 282 and/or escape slab $282_B$ are contemplated (e.g., circular geometries, geometries having curved and/or straight legs and/or branches).

Second segment $281_B$ includes a second end $281_{E2}$ of primary waveguide 281 that is adjacent to NFT 284. In some examples, second segment $281_B$ is substantially orthogonal to media-facing surface 245. Second segment $281_B$ may include a mode converter $281_D$. Mode converter $281_D$ is a branch of primary waveguide 281 that is configured to convert an optical mode of electromagnetic radiation that is emitted by laser 280 (e.g., a transverse electric mode to a transverse magnetic mode, a first transverse electric mode to a second transverse electric mode).

Secondary waveguide 286 includes a first segment $286_A$ adjacent to photodiode 290, a second segment $286_B$ that is at an opposite end of secondary waveguide 286 from first segment $286_A$, and a third segment $286_C$ disposed between first segment $286_A$ and second segment $286_B$. Third segment $281_C$ of primary waveguide 281 and third segment $286_C$ of secondary waveguide 286 are adjacent and substantially parallel to each other and are separated by a gap 295. In this example, third segment $281_C$ and third segment $286_C$ are disposed at an angle relative to media-facing surface 245, first segments $281_A$ and $286_A$, and second segments $281_B$ and $286_B$, although other orientations of third segment $281_C$ and third segment $286_C$ are contemplated. A portion of electromagnetic radiation that laser 280 emits may propagate in primary waveguide 281 and couple to secondary waveguide 286 across gap 295.

First segment $286_A$ of secondary waveguide 286 includes a first end $286_{E1}$ of secondary waveguide 286 that is adjacent to photodiode 290. First segment $286_A$ is coupled to a decoupler 288. Decoupler 288 of HAMR head 230 has a rectangular portion proximal to photodiode 290 and a second portion that tapers away from photodiode 290. Other shapes and geometries of decoupler 288 are contemplated (e.g., circular geometries, geometries having curved and/or straight legs and/or branches). Second segment $286_B$ of HAMR head 230 includes a second end $286_{E2}$ of waveguide 286. Second segment $286_B$ is coupled to escape slab $282_B$ and includes a hooked shape that may mitigate reflections of electromagnetic radiation into photodiode 290. Other shapes of second segment $286_B$ are contemplated (e.g., straight, blocked, angled).

It should be noted that coupler 282 (including escape slab $282_B$), mode converter $281_D$, and decoupler 288 are optional and in no way required for successful operation of HAMR 230 and the features described herein. These features may be components that are used for particular configurations of HAMR head 230 (e.g., particular configurations of laser 280 (e.g., emission wavelengths) and/or particular configurations (e.g., geometries) of NFT 284). Thus, while a particular embodiment of HAMR head 230 is illustrated herein, it should be understood that some, in any combination, of the above features may be omitted in any particular substantiation of HAMR head 230.

Figure 4:
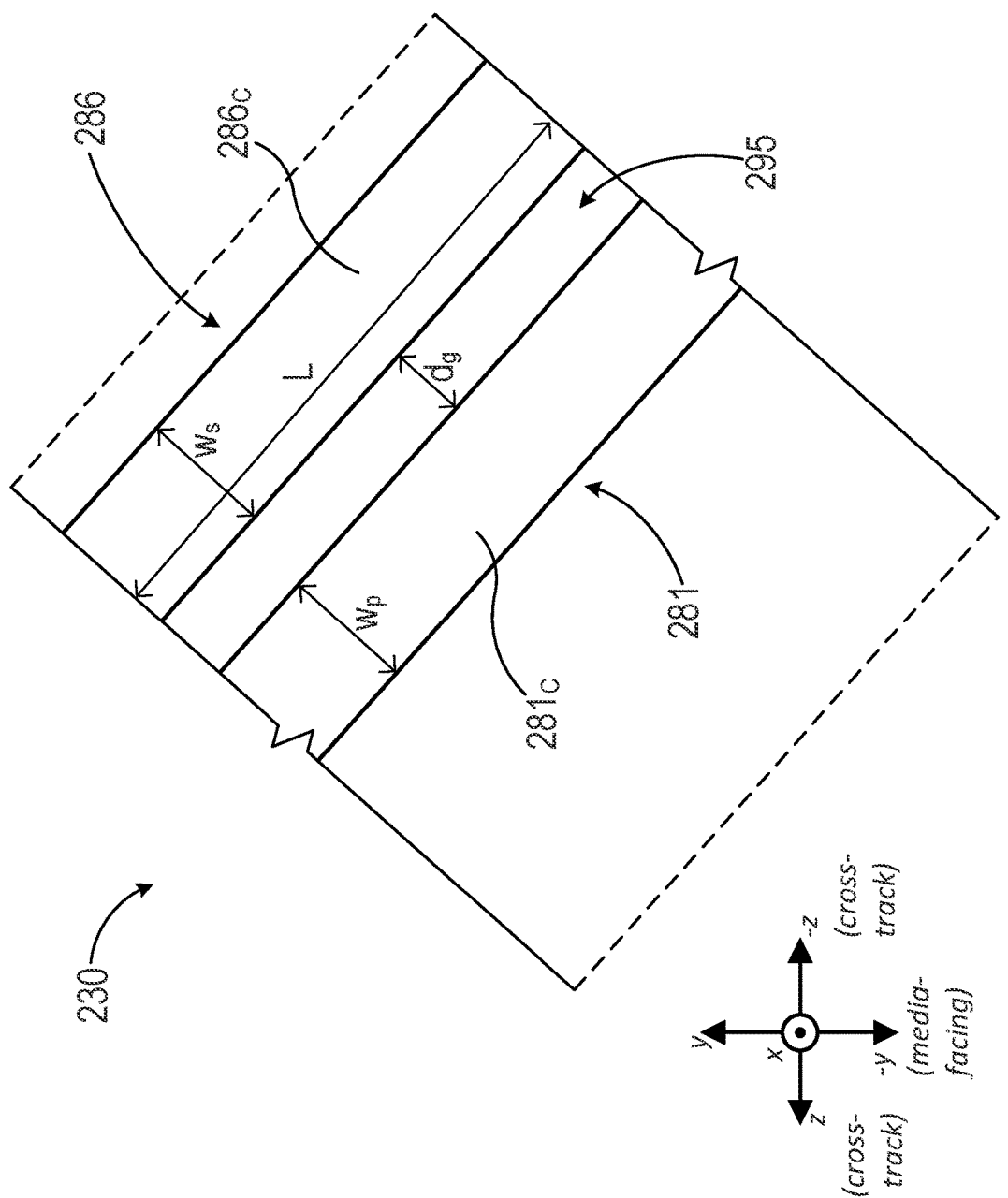
FIG. 4 is a view of a primary waveguide and a secondary waveguide of an example HAMR head, in accordance with aspects of this disclosure.

FIG. 4 is a view of a primary waveguide and a secondary waveguide of an example HAMR head, in accordance with aspects of this disclosure. Primary waveguide 281 and secondary waveguide of HAMR head 230 may be an example of primary waveguide 281 and secondary waveguide 286 of HAMR head 230 of FIG. 3A, FIG. 3B, and/or FIG. 3C. A segment $281_C$ of primary waveguide 281 and a segment $286_C$ of secondary waveguide 286 are adjacent and substantially parallel to each other and are separated by a gap 295. Segment $281_C$ may be an example of third segment $281_C$ of primary waveguide 281 of FIG. 3A, FIG. 3B, and/or FIG. 3C. Segment $286_C$ may be an example of third segment $286_C$ of primary waveguide 281 of FIG. 3A, FIG. 3B, and/or FIG. 3C. Segment $281_C$ of primary waveguide 281 has a width $w_p$. Segment $286_C$ of secondary waveguide 286 has a width $w_s$. Gap 295 has a width $d_g$. In some examples, width $d_g$ is up to approximately 1 micrometers. In some examples, width $d_g$ is from about 50 to approximately 500 nanometers. In the context of the present disclosure, the term "approximately" in reference to a dimension implies the numerical value with a range of plus or minus 10 percent. In some examples of HAMR 230, width $w_p$, width $w_s$, and/or width $d_g$ may impact the amount of electromagnetic radiation that is coupled from primary waveguide 281 to secondary waveguide 286. For example, the relative ratio of widths $w_p$ and/or $w_s$ to width $d_g$ may affect the percentage of light that is transferred from primary waveguide 281 to secondary waveguide 286. These dimensions may therefore be tuned in some designs of HAMR head 230 to control the magnitude of this transfer.

Segment $281_C$ of primary waveguide 281 and segment $286_C$ of secondary waveguide 286 are adjacent and substantially parallel to each other over a length L. In some examples, length L is up to 50 micrometers. In some examples, length L is less than 1 micrometer. That is, in some examples, a segment $281_C$ of primary waveguide 281 may be adjacent to a segment $286_C$ of secondary waveguide 286 over a short distance (e.g., at a bend between first segment $281_A$ and second segment $281_B$ of primary waveguide 281 and a bend between first segment $286_A$ and second segment $286_B$ of secondary waveguide 286 in the examples of FIG. 3A, FIG. 3B, and/or FIG. 3C). In one example, length L is from less than 1 micrometer to approximately 30 micrometers. Length L may impact the amount of electromagnetic radiation that is coupled from primary waveguide 281 to secondary waveguide 286. In some examples, the ratio of length L to width $d_g$ may affect the percentage of light that is transferred from primary waveguide 281 to secondary waveguide 286. Length L and width $d_g$ may therefore be tuned and dimensioned in some designs of HAMR head 230 to control the magnitude of this transfer.

Figure 5:
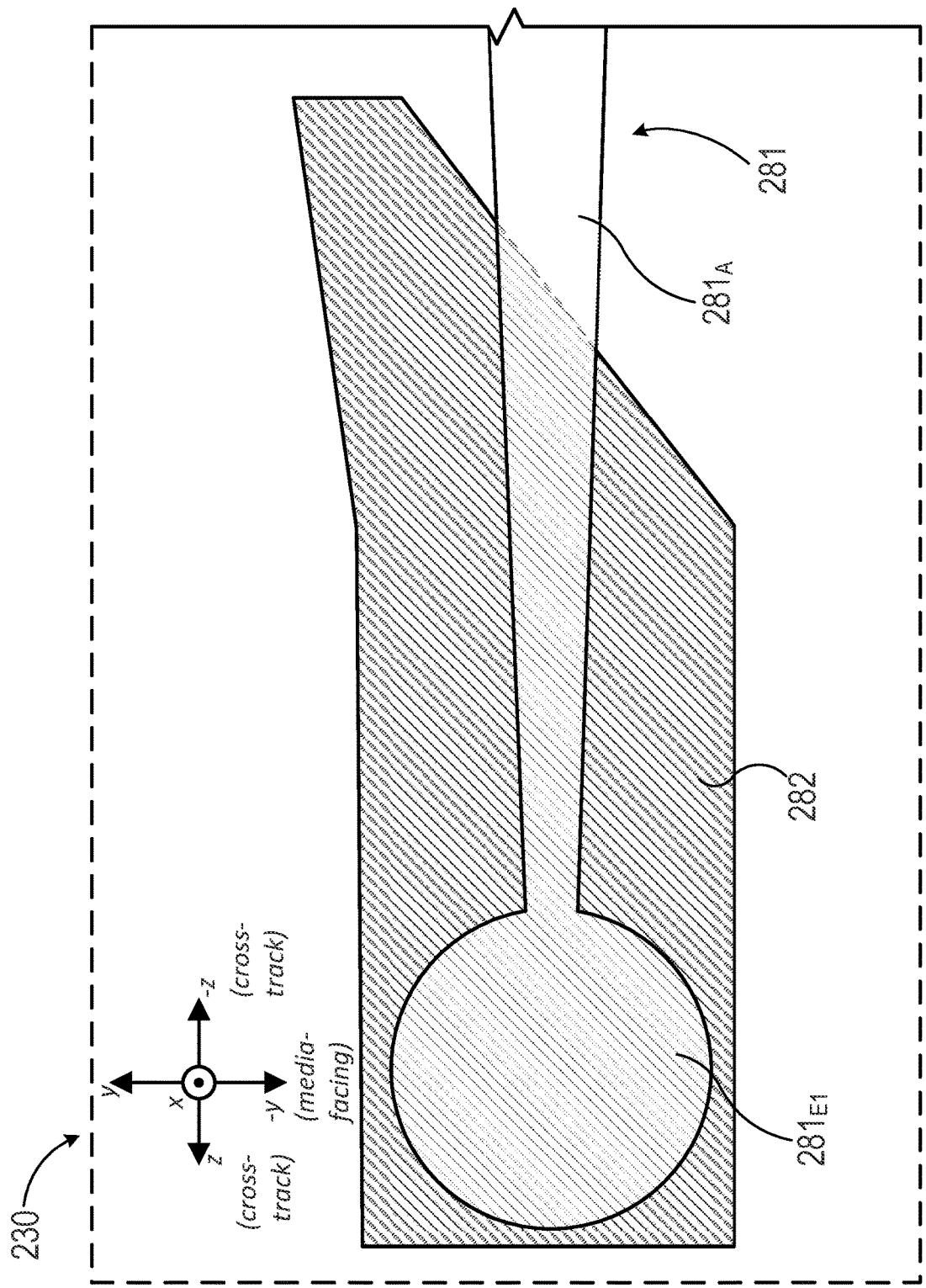
FIG. 5 is a view of a primary waveguide and a coupler of an example HAMR head, in accordance with aspects of this disclosure.

FIG. 5 is a view of a primary waveguide and a coupler of an example HAMR head, in accordance with aspects of this disclosure. Primary waveguide 281 and coupler 282 of HAMR head 230 of FIG. 5 may be alternative embodiments of primary waveguide 281 and coupler 282 of HAMR head 230 of FIG. 3A, FIG. 3B, and/or FIG. 3C. In this example, primary waveguide 281 includes a first segment $281_A$ having a first end $281_{E1}$ that has a circular profile. First segment $281_A$ and first end $281_{E1}$ may be alternative examples of first segment $281_A$ and first end $281_{E1}$ of primary waveguide 281 of FIG. 3A, FIG. 3B, and/or FIG. 3C. The circular portion of first end $281_{E1}$ is coupled to coupler 282. In other examples, other embodiments of coupler 282 are contemplated (e.g., the embodiments of coupler 282 of FIG. 3B and FIG. 3C).

FIG. 6A is a view of a secondary waveguide and an escape slab of an example HAMR head, in accordance with aspects of this disclosure. Secondary waveguide 286 of HAMR head 230 of FIG. 6A may be an alternative embodiment of secondary waveguide 286 of HAMR head 230 of FIG. 3A, FIG. 3B, and/or FIG. 3C. In this example, secondary waveguide 286 terminates at a straight segment $286_B$. Segment $286_B$ may be an example of second segment $286_B$ of FIG. 3A, FIG. 3B, and/or FIG. 3C. Other embodiments of this example of secondary waveguide 286 are contemplated, including embodiments in combination with other features described in the other figures of this disclosure. For example, segment $286_B$ may be coupled to an escape slab (e.g., escape slab $282_B$ of coupler 282 of FIG. 3C).

Figure 6B:
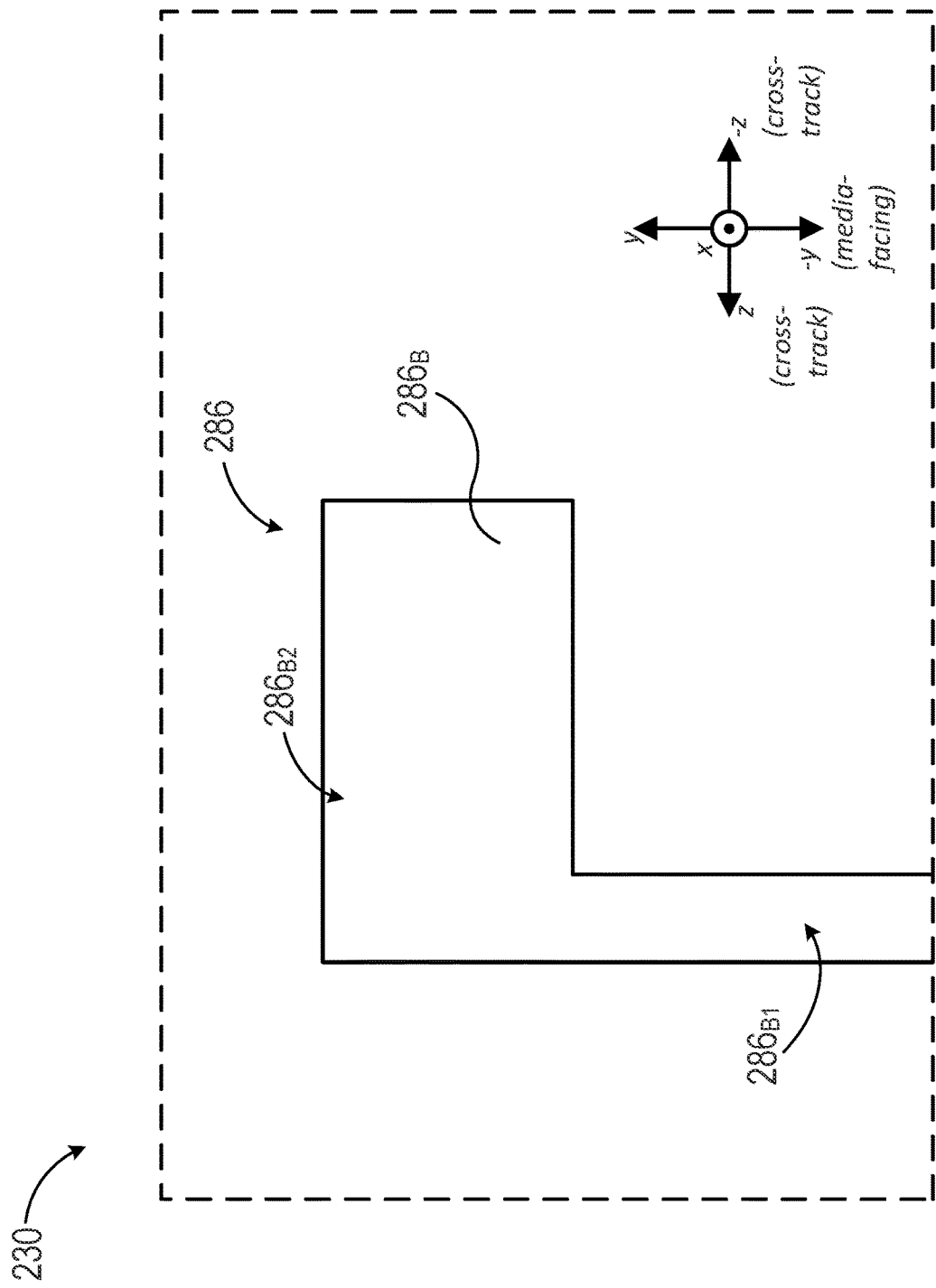
FIG. 6B is a view of a secondary waveguide and an escape slab of an example HAMR head, in accordance with aspects of this disclosure.

FIG. 6B is a view of a secondary waveguide of an example HAMR head, in accordance with aspects of this disclosure. Secondary waveguide 286 of HAMR head 230 of FIG. 6A may be an alternative embodiment of secondary waveguide 286 of HAMR head 230 of FIG. 3A, FIG. 3B, and/or FIG. 3C. In this example, secondary waveguide 286 includes a segment $286_B$. Segment $286_B$ may be an example of second segment $286_B$ of FIG. 3A, FIG. 3B, and/or FIG. 3C. Segment $286_B$ of this example has a leg $286_{B1}$ that terminates at rectangular end $286_{B2}$. In this example, rectangular end $286_{B2}$ is angled by about 90 degrees from leg $286_{B1}$. Other embodiments of this example secondary waveguide 286 are contemplated, including embodiments in combination with other features described in the other figures of this disclosure. For example, leg $286_{B1}$ and/or rectangular end $286_{B2}$ may be coupled to an escape slab (e.g., escape slab $282_B$ of coupler 282 of FIG. 3C).

FIG. 7A is a view of a secondary waveguide and a photodiode of an example HAMR head, in accordance with aspects of this disclosure. Secondary waveguide 286 of HAMR head 230 of FIG. 7A may be an alternative embodiment of secondary waveguide 286 of HAMR head 230 of FIG. 3A, FIG. 3B, and/or FIG. 3C. Secondary waveguide 286 includes a segment 286$_A$ adjacent to a photodiode 290. Segment 286$_A$ of secondary waveguide 286 includes an end 286$_E$ of secondary waveguide 286 that is adjacent to photodiode 290.

Figure 7B:
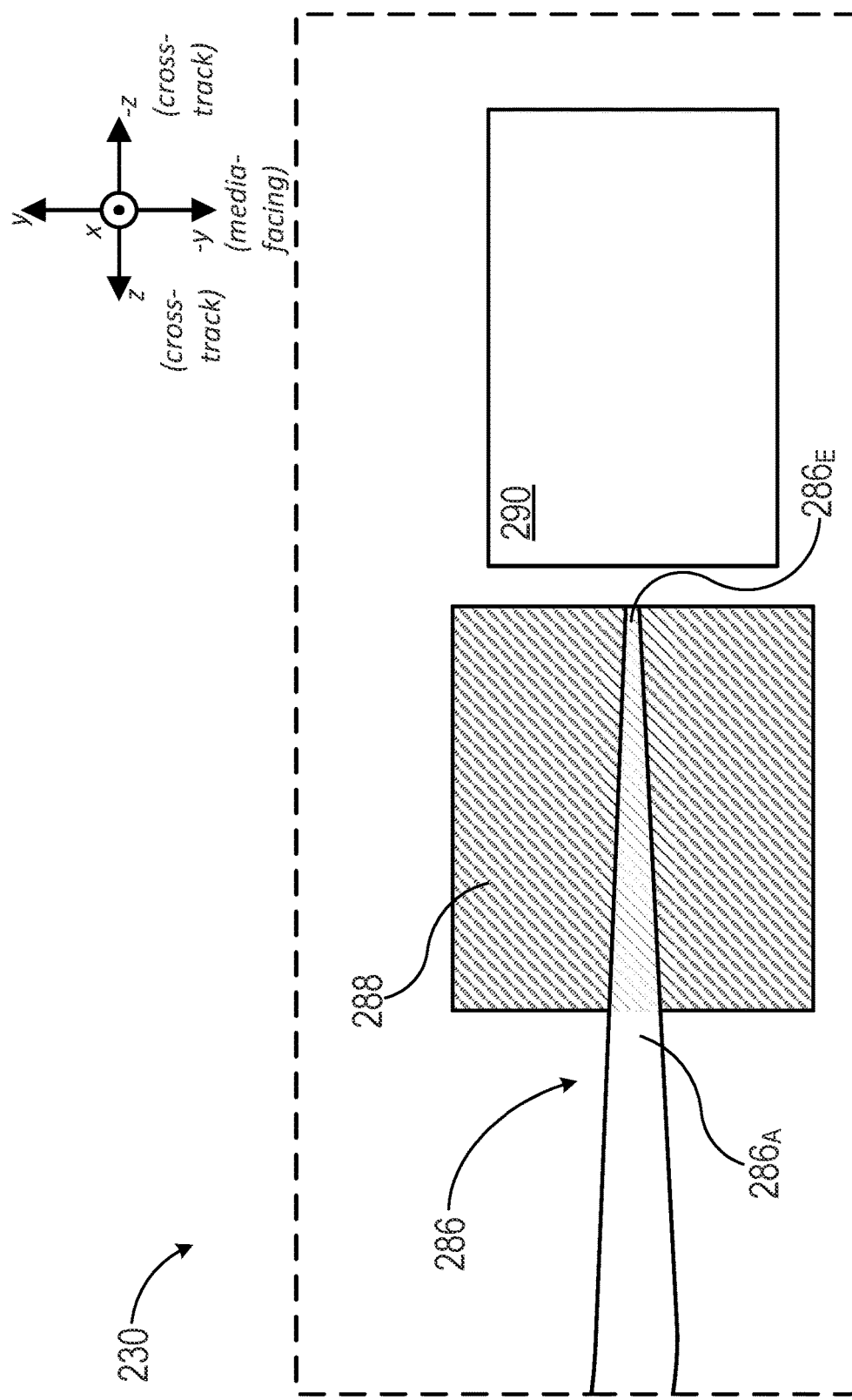
FIG. 7B is a view of a secondary waveguide, a decoupler, and a photodiode of an example HAMR head, in accordance with aspects of this disclosure.

FIG. 7B is a view of a secondary waveguide, a decoupler, and a photodiode of an example HAMR head, in accordance with aspects of this disclosure. Secondary waveguide 286 of HAMR head 230 of FIG. 7B may be an alternative embodiment of secondary waveguide 286 of HAMR head 230 of FIG. 3A, FIG. 3B, and/or FIG. 3C. Secondary waveguide 286 includes a segment 286$_A$ adjacent to a photodiode 290. Segment 286$_A$ of secondary waveguide 286 includes an end 286$_E$ of secondary waveguide 286 that is adjacent to photodiode 290. Segment 286$_A$ is coupled to a decoupler 288. Decoupler 288 of this example has a square profile. Other embodiments of decoupler 288 are contemplated (e.g., a decoupler 288 having a rectangular profile, an elliptical profile, or a circular profile). Decoupler 288 may be an alternative embodiment of decoupler 288 of HAMR head 230 of FIG. 3A, FIG. 3B, and/or FIG. 3C.

Figure 7C:
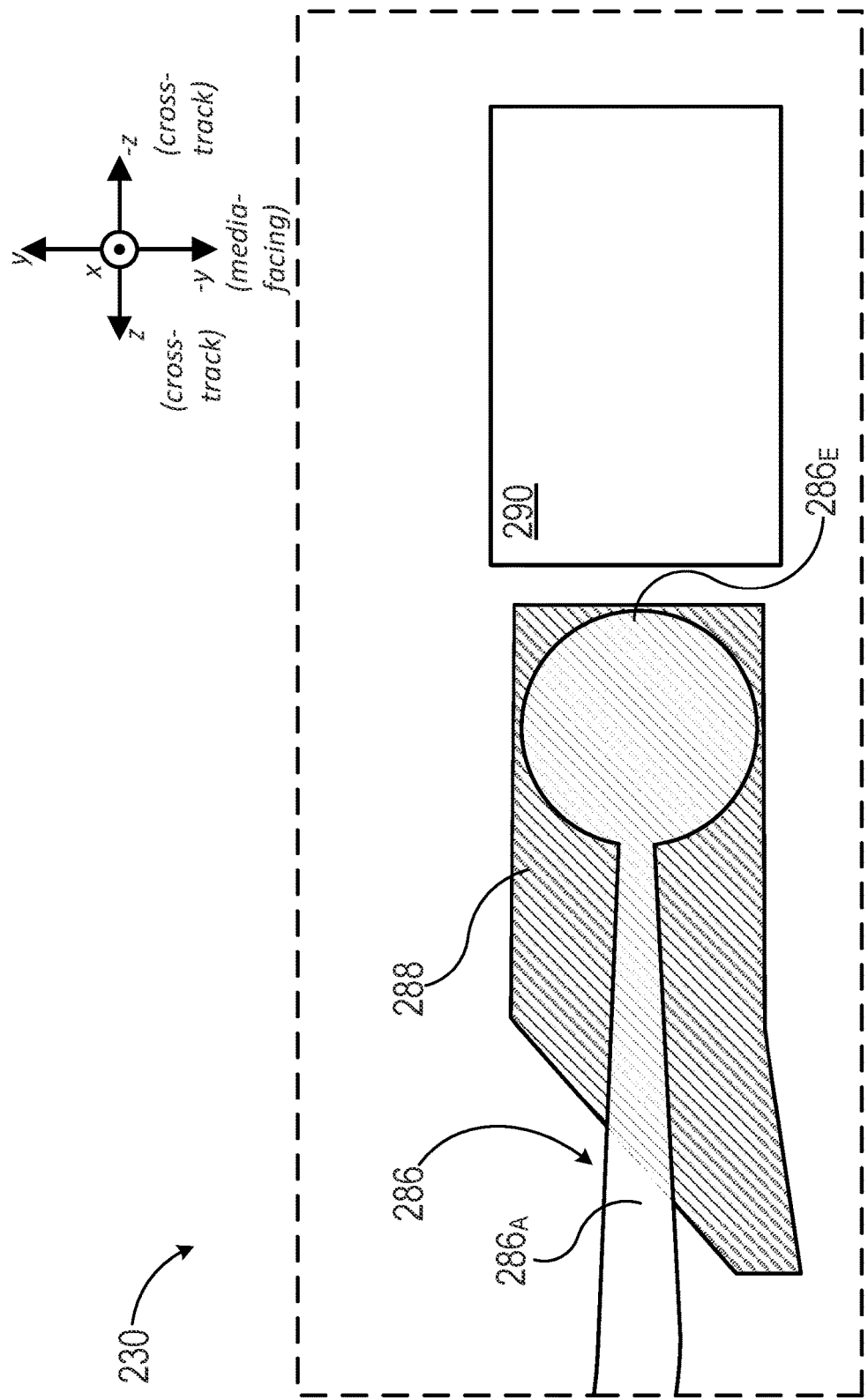
FIG. 7C is a view of a secondary waveguide, a decoupler, and a photodiode of an example HAMR head, in accordance with aspects of this disclosure.

FIG. 7C is a view of a secondary waveguide, a decoupler, and a photodiode of an example HAMR head, in accordance with aspects of this disclosure. Secondary waveguide 286 of HAMR head 230 of FIG. 7C may be an alternative embodiment of secondary waveguide 286 of HAMR head 230 of FIG. 3A, FIG. 3B, and/or FIG. 3C. Secondary waveguide 286 includes a segment 286$_A$ adjacent to a photodiode 290. Segment 286$_A$ of secondary waveguide 286 includes an end 286$_E$ of secondary waveguide 286 that is adjacent to photodiode 290. End 286$_E$ of this example has a circular profile. Segment 286$_A$ is coupled to a decoupler 288. Other embodiments of decoupler 288 are contemplated, such as those embodiments described elsewhere in this disclosure (e.g., decoupler 288 of FIG. 7B.

Figure 7D:
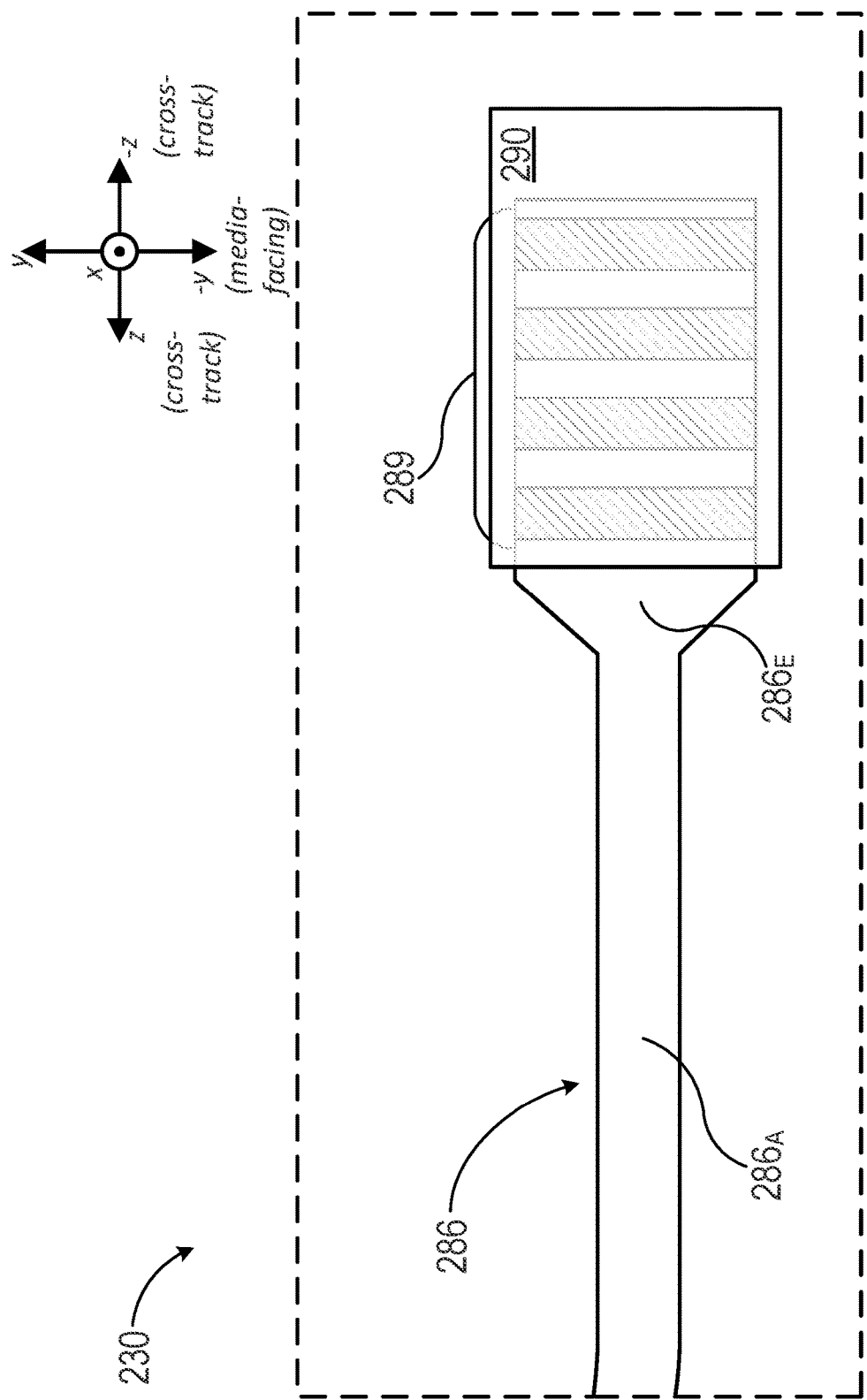
FIG. 7D is a view of a secondary waveguide, an optical grating, and a photodiode of an example HAMR head, in accordance with aspects of this disclosure.

FIG. 7D is a view of a secondary waveguide and a photodiode of an example HAMR head, in accordance with aspects of this disclosure. Secondary waveguide 286 of HAMR head 230 of FIG. 7A may be an alternative embodiment of secondary waveguide 286 of HAMR head 230 of FIG. 3A, FIG. 3B, and/or FIG. 3C. Secondary waveguide 286 includes a segment 286$_A$ adjacent to a photodiode 290. Segment 286$_A$ of secondary waveguide 286 includes an end 286$_E$ of secondary waveguide 286 that is adjacent to photodiode 290. Photodiode 290 is adjacent to a grating structure 289 that is configured to direct a portion of electromagnetic radiation (e.g., from a primary waveguide) into photodiode 290. In some examples, grating structure 289 is patterned (e.g., etched) into secondary waveguide 286, such as into end 286$_E$. In other examples, grating structure 289 is disposed on secondary waveguide 286, for example on end 286$_E$ and between end 286$_E$ and photodiode 290. End 286$_E$ may be wider than other parts of waveguide 286 such that end 286$_E$ overlaps a larger area of photodiode 290, potentially enabling more electromagnetic radiation to be directed into photodiode 290. A grating structure 289 that is disposed on secondary waveguide 286 may include a material having a different index of refraction than a material that is included in secondary waveguide 286.

Figure 8:
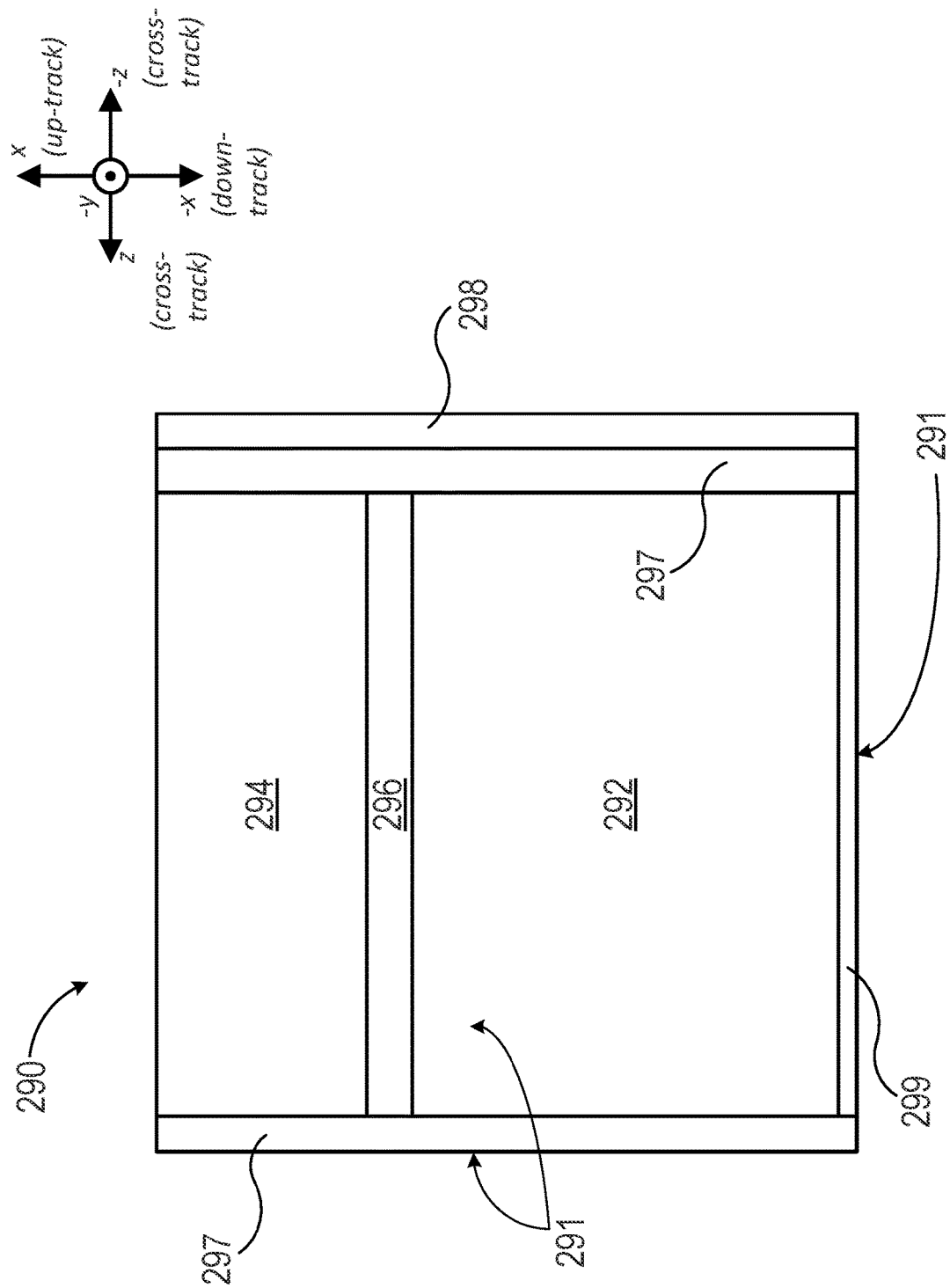
FIG. 8 is a cross-sectional view of an example photodiode, in accordance with aspects of this disclosure.

FIG. 8 is a cross-sectional view of an example photodiode, in accordance with aspects of this disclosure. Photodiode 290 of FIG. 8 may be an example of photodiode 290 of example HAMR heads of this disclosure, such as HAMR head 230 of FIG. 3A, FIG. 3B, and/or FIG. 3C. Electromagnetic radiation may enter photodiode 290 through one or more facets 291 of photodiode 290 (e.g., from a secondary waveguide 286, from a decoupler 288, from a grating structure 289).

Photodiode 290 includes an n-doped region 292, a p-doped region 294, a multi-quantum well (MQW) structure 296, and layers 297 and 298. Photodiode 290 may include a release layer 299 that is configured to be removed to enable transfer of photodiode 290 from a first substrate (e.g., a donor substrate) to a second substrate (e.g., a wafer on which HAMR head 230 is being fabricated). Layers 297 and 298 and release layer 299 are optional and are not required for operation of photodiode 290. Additionally, the presence and/or composition of n-doped region 292, p-doped region 294, and MQW structure 296 may vary by example.

N-doped region 292 may include a material such as GaAs and/or AlGaAs that is doped with a dopant (e.g., silicon, selenium, tellurium, sulfur). In some examples, n-doped region 292 includes multiple layers having different materials, different dopant, and/or different doping concentrations. In some examples, n-doped region 292 includes a region or layer having a graded doping concentration (e.g., a doping concentration that increases or decreases toward MQW structure 296).

P-doped region 294 may include a material such as GaAs and/or AlGaAs that is doped with a dopant (e.g., carbon, beryllium, magnesium, zinc, cadmium). In some examples, p-doped region 294 includes multiple layers having different materials, different dopant, and/or different doping concentrations. In some examples, p-doped region 294 includes a region or layer having a graded doping concentration (e.g., a doping concentration that increases or decreases toward MQW structure 296).

MQW structure 296 is disposed between n-doped region 292 and p-doped region 294. MQW structure 296 may include alternating layers of different materials. For example, MQW structure 296 may include alternating layers of GaAs and AlGaAs.

Layers 297 and 298 may be configured to promote coupling of electromagnetic radiation into photodiode 290 and/or confine electromagnetic radiation to photodiode 290 (e.g., by reducing scattering of electromagnetic radiation). Layers 297 and/or 298 may cover one or more outer surfaces of photodiode 290. Layers 297 may include one or more layers of optically transparent materials (e.g., silicon dioxide, silicon nitride). Layer 298 may include one or more layers of optically reflective materials (e.g., gold, titanium).

Photodiode 290 of FIG. 8 is one example of a photodiode that may be included in an example HAMR head of this disclosure. The structure of photodiode 290 may vary by materials, constituent layers, and composition. It is not the intention of this disclosure to limit examples to specific structures of photodiode 290, and other structures of photodiode 290 are considered to be within the scope of this disclosure.

Various examples have been presented for the purposes of illustration and description. Other examples may include some features and/or embodiments described in various combinations. Some examples may include embodiments with one or more described features omitted. Some examples may include variations of features and/or embodiments (e.g., geometric variations, material variations). These and other examples are within the scope of the following claims.

What is claimed is:

1. A heat-assisted magnetic recording head comprising:
a first waveguide configured to propagate light from a laser to a near-field transducer; and
a second waveguide having a middle segment disposed between a first end segment and a second end segment, the second waveguide configured such that (a) the middle segment is substantially parallel with and in close proximity to a portion of the first waveguide to thereby couple a portion of the light propagating in the first waveguide into the middle segment of the second waveguide, (b) the first end segment propagates light coupled into the second waveguide to a photodiode located near a termination point of the first end segment, and (c) the second end segment has a hooked shape that mitigates reflections of light propagating in the second end segment from reaching the photodiode.

2. The heat-assisted magnetic recording head of claim 1, wherein the middle segment of the second waveguide is separated from the portion of the first waveguide by a gap having a width of about 50 nanometers to about 1 micrometer.

3. The heat-assisted magnetic recording head of claim 1, wherein the middle segment of the second waveguide and the portion of the first waveguide are substantially parallel to each other over a length of about 30 micrometers or less.

4. The heat-assisted magnetic recording head of claim 1, wherein the photodiode is adjacent to a grating structure that is configured to direct light from the second waveguide into the photodiode.

5. The heat-assisted magnetic recording head of claim 1, wherein the first waveguide is coupled to a coupler that is configured to direct light emitted by the laser into the primary waveguide.

6. The heat-assisted magnetic recording head of claim 5, wherein the coupler includes a hooked shape that is configured mitigate light reflections.

7. The heat-assisted magnetic recording head of claim 5, wherein the coupler includes an escape slab that is configured to disperse stray light.

8. The heat-assisted magnetic recording head of claim 1, wherein the first end segment of the second waveguide is coupled to a coupler that is configured to direct light into the photodiode.

* * * * *